(12) United States Patent
Fried

(10) Patent No.: US 11,151,213 B2
(45) Date of Patent: Oct. 19, 2021

(54) BROWSER SEARCH RESULT OPTION TO FACILITATE HUMAN SPIDERING

(71) Applicant: International Business Machines Corporation, Armonk, NY (US)

(72) Inventor: Eric P. Fried, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 15/044,165

(22) Filed: Feb. 16, 2016

(65) Prior Publication Data

US 2016/0162590 A1 Jun. 9, 2016

Related U.S. Application Data

(63) Continuation of application No. 14/275,501, filed on May 12, 2014, now abandoned.

(51) Int. Cl.
| | |
|---|---|
| G06F 16/954 | (2019.01) |
| H04L 29/08 | (2006.01) |
| G06F 16/951 | (2019.01) |
| G06F 16/901 | (2019.01) |
| G06F 16/955 | (2019.01) |
| G06F 40/14 | (2020.01) |
| G06F 3/0484 | (2013.01) |

(52) U.S. Cl.
CPC .......... *G06F 16/954* (2019.01); *G06F 3/0484* (2013.01); *G06F 16/9027* (2019.01); *G06F 16/951* (2019.01); *G06F 16/955* (2019.01); *G06F 40/14* (2020.01); *H04L 67/22* (2013.01)

(58) Field of Classification Search
CPC ..... G06F 17/30864; G06F 17/30; H04L 67/22

USPC ......................................................... 707/705
See application file for complete search history.

(56) References Cited

U.S. PATENT DOCUMENTS

| | | | | |
|---|---|---|---|---|
| 6,189,024 | B1* | 2/2001 | Bauersfeld | G06F 17/30873 707/999.01 |
| 8,402,359 | B1* | 3/2013 | Pogodin | G06F 17/30876 715/206 |
| 2006/0253462 | A1* | 11/2006 | Gras | G06F 17/30855 707/999.01 |
| 2015/0324462 | A1 | 11/2015 | Fried | |

OTHER PUBLICATIONS

TOUCHGRAPH, Touchgraph Navigation, downloaded May 20, 2016; http://www.touchgraph.com/seo, 2014.*
ibm-ip.com—Prior Art Database Technical Disclosure (IP.com No. IPCOM000179711D.*
IBM—IP.com Prior Art Database Technical Disclosure (IP.com No. IPCOM000179781D).*

(Continued)

*Primary Examiner* — Hosain T Alam
*Assistant Examiner* — Tracy M McGhee
(74) *Attorney, Agent, or Firm* — Jared L. Montanaro

(57) ABSTRACT

Techniques are provided for automatically generating a hierarchical representation of a navigation order within a web browsing session in conjunction with a traversing of a plurality of websites within the browsing session: flagging a subset of the plurality of websites; displaying a user interface in conjunction with the browser such that the user interface provides a traversal control with respect to the subset in accordance with the hierarchical representation; and traversing the subset utilizing the traversal control.

7 Claims, 6 Drawing Sheets

(56) References Cited

OTHER PUBLICATIONS

IBM—IP.com Prior Art Database Technical Disclosure (IP.com No. IPCOM000178039D).*

IBM, "Method for Topic Based History Maintenance and Navigation in Web Browsers," IP.com Electronic Publication, Sep. 20, 2006.

IBM, "A Mechanism for Enhancing Usability by Providing Historical Path Information in a Hierarchical Form," IP.com Electronic Publication, Jan. 14, 2009.

IBM, "Heap-based Web Pages Management System," IP.com Electronic Publication, Feb. 25, 2009.

Dodge, "An Atlas of Cyberspaces," downloaded May 12, 2014 from <http://personalpages.manchester.ac.uk/staff/m.dodge/cybergeography/atlas/surf.html>, Feb. 2007.

Gunderloy, "Visual Web Browsing Starts to Take Hold," downloaded May 12, 2014 from <http://gigaom.com/2008/01/31/visual-web-browsing-starts-take-hold/>, Jan. 31, 2008.

Touchgraph, Touchgraph Navigation, downloaded May 12, 2014 from <http://www.touchgraph.com/seo>, (c) 2014.

* cited by examiner

REPLACE USING KOR 1. yaş 35-45 arası erkek için doğru olmayan ifade  
(a)
(b)
(c)
(d)  olarak sonuç hangisi  
İnsanların bölgesine mülkü, ben çok çeşitli  
Programmatic

===

BROWSER SEARCH RESULT OPTION TO FACILITATE HUMAN SPIDERING

CROSS REFERENCES TO RELATED APPLICATIONS

The present application is a continuation and claims the benefit of the filing date of an application entitled, "Browser Search Result Option to Facilitate Human Spidering" Ser. No. 14/275,501, filed May 12, 2014, assigned to the assignee of the present application, and herein incorporated by reference.

FIELD OF DISCLOSURE

The claimed subject matter relates generally to techniques for searching web pages and, more specifically, for facilitating user tracking and navigating of search results.

BACKGROUND OF THE INVENTION

In the decades since the advent of the Internet, millions of web sites and web pages have become available, or "posted." Search engines enable users to locate websites related to a particular topic. Unfortunately, a single search may produce thousands of results, or "hits," and each result may suggest other search criteria on which to to focus or redirect the search. In addition, each search result may typically provide access to other web sites, or "links." In other words, a user may need to search multiple websites and related links before locating desired information.

As a user performs different searches using different criteria, the results of previous searches are typically lost, if a user decides that a previous search may have produced better results than a current one, there is no simple way to retrace the steps that led to the current result. One technique to preserve previous searches involves initiating each new search in its own window. However, this techniques may lead to too many open windows and no efficient means to track either the sequence or chronology of the individual windows.

Another technique involves assigning a "bookmark" to each window and locating a previous search by traversing the assigned bookmarks. In this technique, a user may follow each link shallowly, bookmark the resulting page, go 'back', repeat; and then start traversing bookmarks, expanding/culling the list as they go. One drawback to this approach is the inefficiency of "to-ing" and "fro-ing." In addition a user has a low probability of adoption of this technique. A user is more likely to pursue a link in depth than to ignore the content, bookmark it, and come back later.

SUMMARY

Provided are techniques for designating particular search results as "roots" and generating, during web browsing, a tree or web structure to facilitate later traversals of web search results. The techniques include automatically generating a hierarchical representation of a navigation order within a web browsing session in conjunction with a traversing of a plurality of websites within the browsing session; flagging to subset of the plurality of websites; displaying a user interface in conjunction with the browser such that the user interlace provides a traversal control with respect to the subset in accordance with the hierarchical representation; and traversing the subset utilizing the traversal control.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF TIRE DRAWINGS

A better understanding of the claimed subject matter can be obtained when the following detailed description of the disclosed embodiments is considered in conjunction with the following figures, in which:

DETAILED DESCRIPTION

Figure 1:
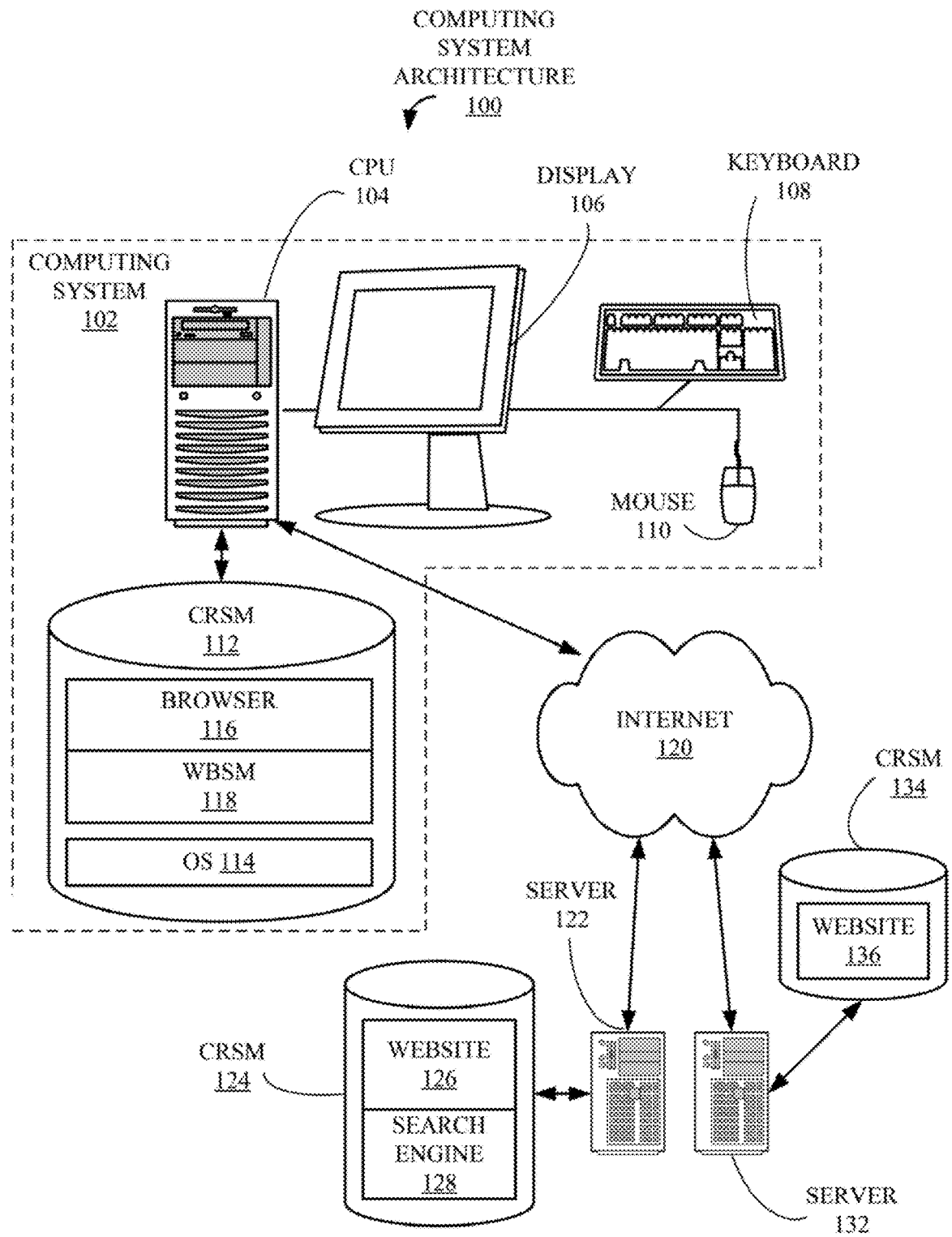
FIG. 1 is a block diagram of a computing system architecture on which the claimed subject matter may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or to computer readable storage medium. A computer readable storage medium may be for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages. including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is one example of a computing system architecture 100 that on which the claimed subject matter may be implemented. A computing system 102 includes a central processing unit (CPU) 104, coupled to a display 106, a keyboard 108 and a pointing device, or "mouse," 110, which together facilitate human interaction with elements of architecture 100 and computing system 102. CPU 104 may include a plurality of processors (not shown). Also included in computing system 102 and attached to CPU 104 is a computer-readable storage medium (CRSM) 112, which may either be incorporated into CPU 104 i.e. an internal device, or attached externally to CPU 104 by means of various, commonly available connection devices such as but not limited to, a universal serial bus (USB) port (not shown). CRSM 112 is illustrated storing an operating system (OS) 114, a web navigation application, or "browser," 116 coupled to a and a Web Browser Spider Module (WBSM) 118.

In this example, WBSM 118 is responsible for implementing the claimed subject matter. Further, WBSM 118 may be deployed separately from browser 116 and is not specific to browser 116. In other words, WBSM 118 may be employed in conjunction with browser 116. OS 114 and computer navigation devices other than a web browser. WBSM 118 is described in more detail below in conjunction with FIGS. 2-6.

Computing system 102 and CPU 104 are connected to the Internet 120, which is also connected to a two (2) server computers, or simply "servers," 122 and 132. Although in this example, CPU 104 and servers 122 and 132 are communicatively coupled via the Internet 120, they could also be coupled through any number of communication mediums such as, but not limited to, a local area network (LAN) (not shown). Server 122 is coupled to a CRSM 124, which like CRSM 112, may either be incorporated into server 122 i.e. an internal device, or attached externally to server 122 by means of various, commonly available connection devices such as but not limited to, a universal serial bus (USB) port (not shown). In this example, stored on CRSM 124 is logic associated with a web site 126 and a search engine 128 associated with web site 126. In a similar fashion, server 132 is coupled to a CRSM 134, which stores logic associated with a website 136. Implementation and functionality associated with websites 126 and 136 and search engine 128 should be familiar to those with skill in the computing arts. It should also be noted there are many possible computing system configurations, of which computing, system architecture 109 and computing system 102 are only simple examples used for the purpose of illustration.

Figure 2:
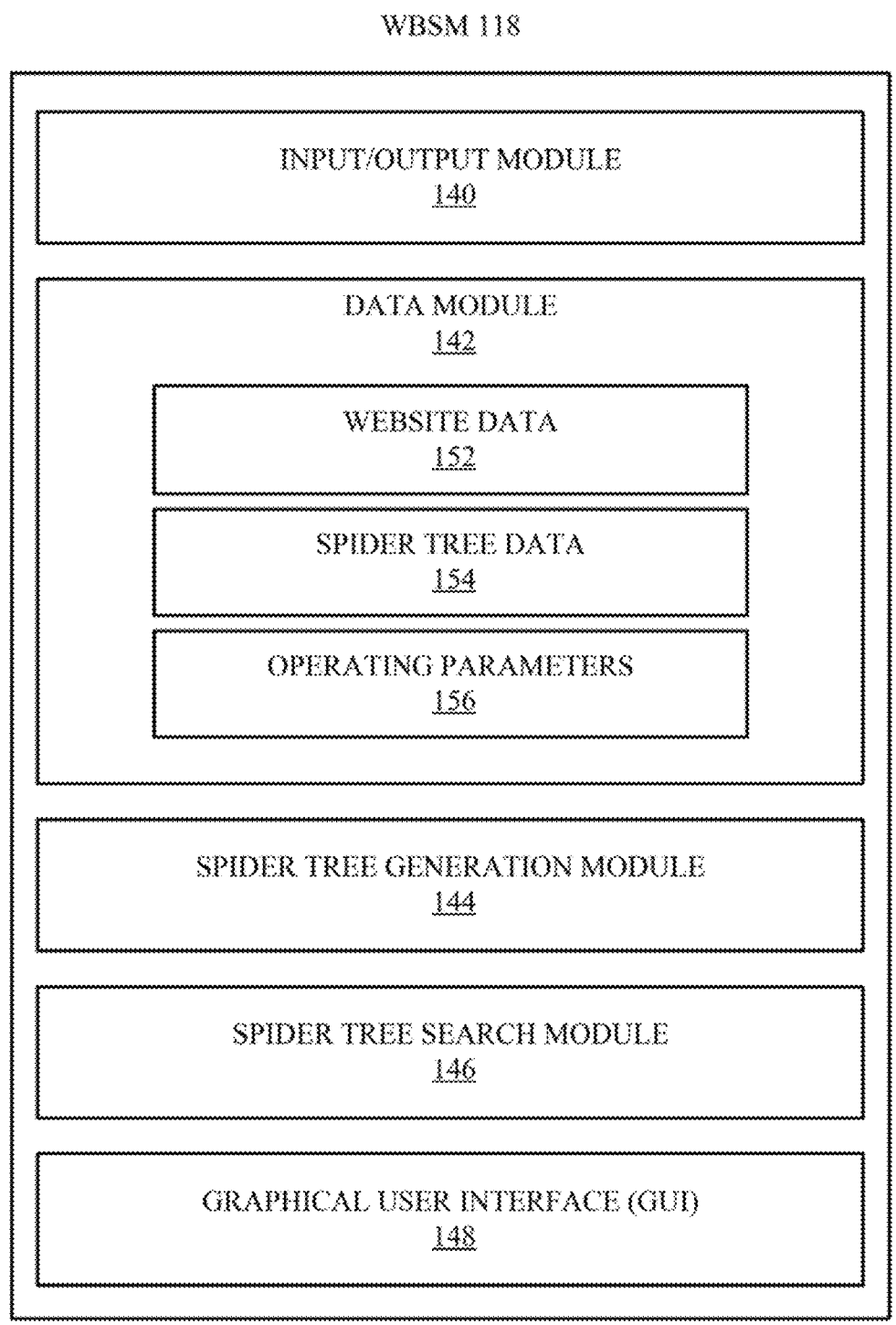
FIG. 2 is a block diagram Web Browser Spidering Module (WBSM), first introduced in conjunction with FIG. 1 in more detail.

FIG. 2 is a block diagram of WBSM 118, first introduced above in conjunction with FIG. 1, in greater detail. WBSM 118 includes an input/output (I/O) module 140, a data module 142, a spider tree generation module 144, a spider tree search module 146 and as graphical user interface 148. For the sake of the following examples, logic associated with WBSM 118 is assumed to execute on one or more processors (not shown) of computing system 102 (FIG. 1) and stored in CRSM 112 (FIG. 1), it should be understood that the claimed subject matter can be implemented in many types of computing systems and data storage structures but, for the sake of simplicity, is described only in terms of computer 102 and system architecture 100 (FIG. 1). Further, the representation of WBSM 118 in FIG. 2 is a logical model. In other words, components 140, 142, 144, 146 and 148 may be stored in the same or separates files and loaded and/or executed within computing system 102 either as a single system or as separate processes interacting via any available inter process communication (IPC) techniques. In addition, although illustrated as a part of browser 116, WBSM 118 may also be implemented as a plugin or standalone module.

I/O module 140 handles any communication WBSM 118 has with other components of computing system 102 and architecture 100. Data module 142 is a data repository for information, including website data 152, spider tree data 154 and operating parameters 156. Website data stored information on websites accessed via the Internet 120 (FIG. 1) in accordance with the claimed subject matter. Spider tree data stored information on spider trees (sec 200, FIG. 4) generated in accordance with the claimed subject matter. Operating parameters 156 includes information on various user and administrative preferences that have been set. For example, an administrator may specified a particular tree structure to be utilized or the manner in which commands and results are to be displayed.

Figure 3:
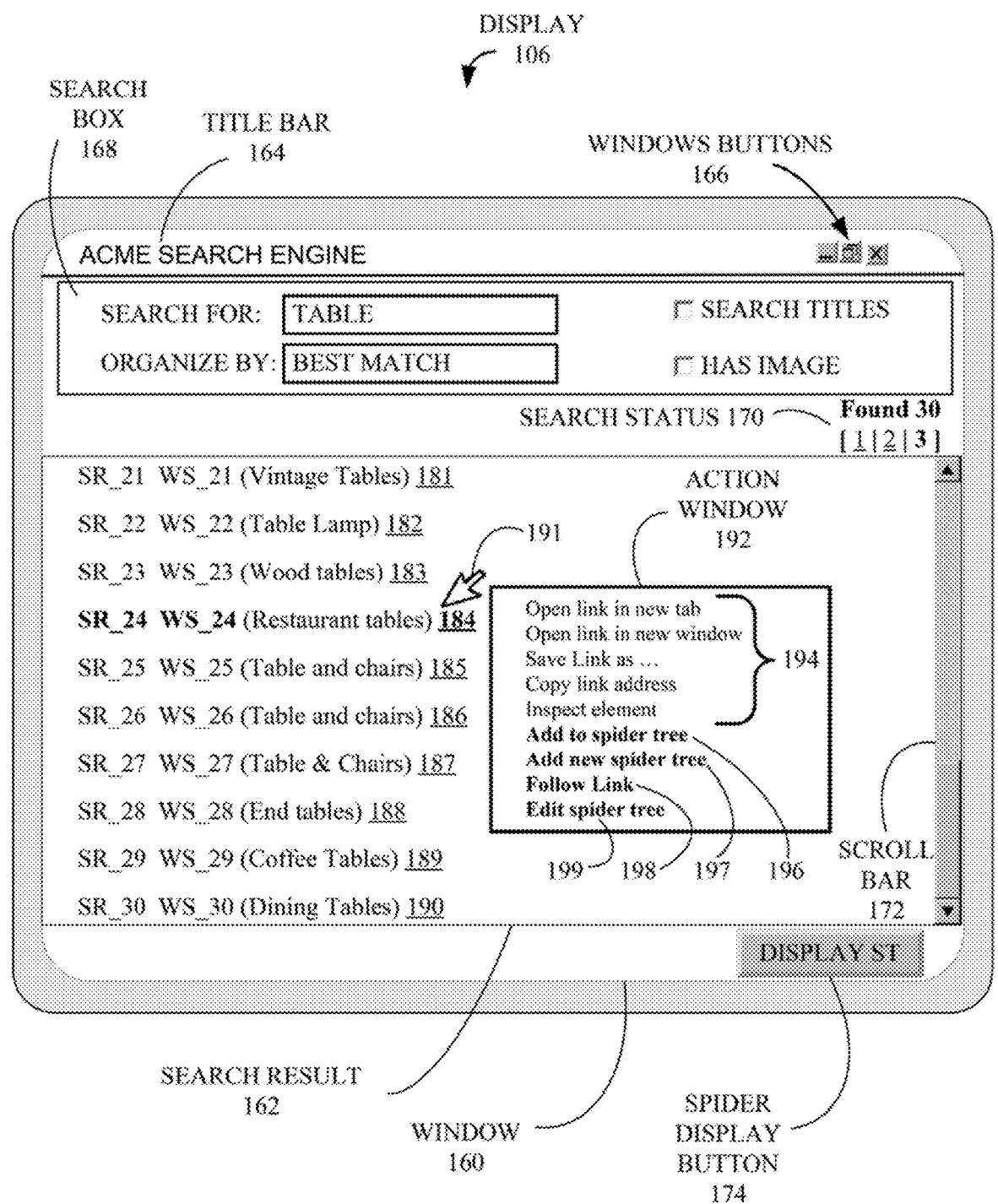
FIG. 3 is an illustration of a graphical user interface (GUI) that enables a user to interact with the WBSM of FIG. 2.

Spider Tree Generation Module 144 is responsible for processing user commands entered via GUI 148 (see 160. FIG. 3) and, if necessary, generating new spider trees (see ST_1 222 and ST_2 224, FIG. 4), Spider Tree Search Module 146 is responsible for locating a particular website link stored in a spider tree in accordance with criteria entered by the user via GUI 148. GUI component 148 enables users and administrators of WBSM 118 to interact, with and to define the desired functionality of WBSM 118, typically by defining variables in operating parameters 156. GUI component 148 is described in more detail below in conjunction with FIG. 3. Although illustrated as part of WBSM 118, GUI 148 may also be implemented in conjunction with a GUI associated with browser 116 (FIG. 1) or OS 114 (FIG. 1). Components 142, 144, 146, 148, 152, 154 and 156 are described in more detail below in conjunction with FIGS. 3-6.

FIG. 3 is one example of a window 160 displayed by WBSM 118 of FIGS. 1 and 2 showing, one manner in which the functionality of WBSM 118 may be utilized by a user. In this example, window 160 is displayed on display 106 (FIG. 1) and is illustrated as showing a search result 162. Search Result includes a title bar 164 that indicates the name of one example of a search engine, i.e., "Acme Search Engine," and various window buttons 166, which enable a user to minimize, maximize and close window 160. A search box 168 enables the user to enter criteria for limiting a particular search in window 160, which, in this example, the user is searching for the term "table" and is specifying that search result 162 be organized in a "Best Match" manner. A search status indicator 179 displays information related to the current search, which, in this example, indicates the search located thirty (30) results and search result 162 is currently displaying the third of three pages of results. A scroll bar 172 enables the user to scroll additional results into search result 162. Those with skill in the computing arts should be familiar with windows, title bars, window buttons, search boxes, search status and scroll bars. A Display Spider Trees (ST) button 174 is used in conjunction with the disclosed subject matter and is explained, in more detail below in conjunction with FIGS. 4-6.

Search result 162 displays the result of a search on the term "table" in search box 168. In this particular section of the total search result are search results, "SR," 181-190, for example, SR_21 WS_21 (Vintage Tables) 181. Line 181 corresponds to the twenty-first search result, i.e., "SR_21," which corresponds to a particular website, i.e., "WS_21." In this example, the fourth result displayed, i.e., "SR_24 WS_24 (Restaurant Tables) 184 is rendered in bold face type to indicate that this particular result has been selected. As should be familiar to those with experience with GUIs, a particular result may be selected by positioning a cursor 191 over the row to be selected. When cursor 191 is positioned over a particular row and a user taps, or "clicks," on a right button (not shown) of mouse 110 (FIG. 1), an action window 192 is displayed in window 160. Action window includes a number of standard options 194. i.e., "Open link in new tab," "Open link in new window," "Save link as, . . . ," "Copy link address" and "Inspect element." In addition action window 192 includes an "Add to spider tree" (ATST) option 196, an "Add new spider tree" (ANST) option 197, a "Follow Link" (FLK) option 198 and an "Edit Spider Tree (EDST)" option 199, which are employed in this example to illustrate aspects of the claimed subject matter. Functionality associated with ATSP option 196. ANST option 197, FLK option 198 and EDST option 199 is described in more detail below in conjunction with FIGS. 4-6.

Figure 4:
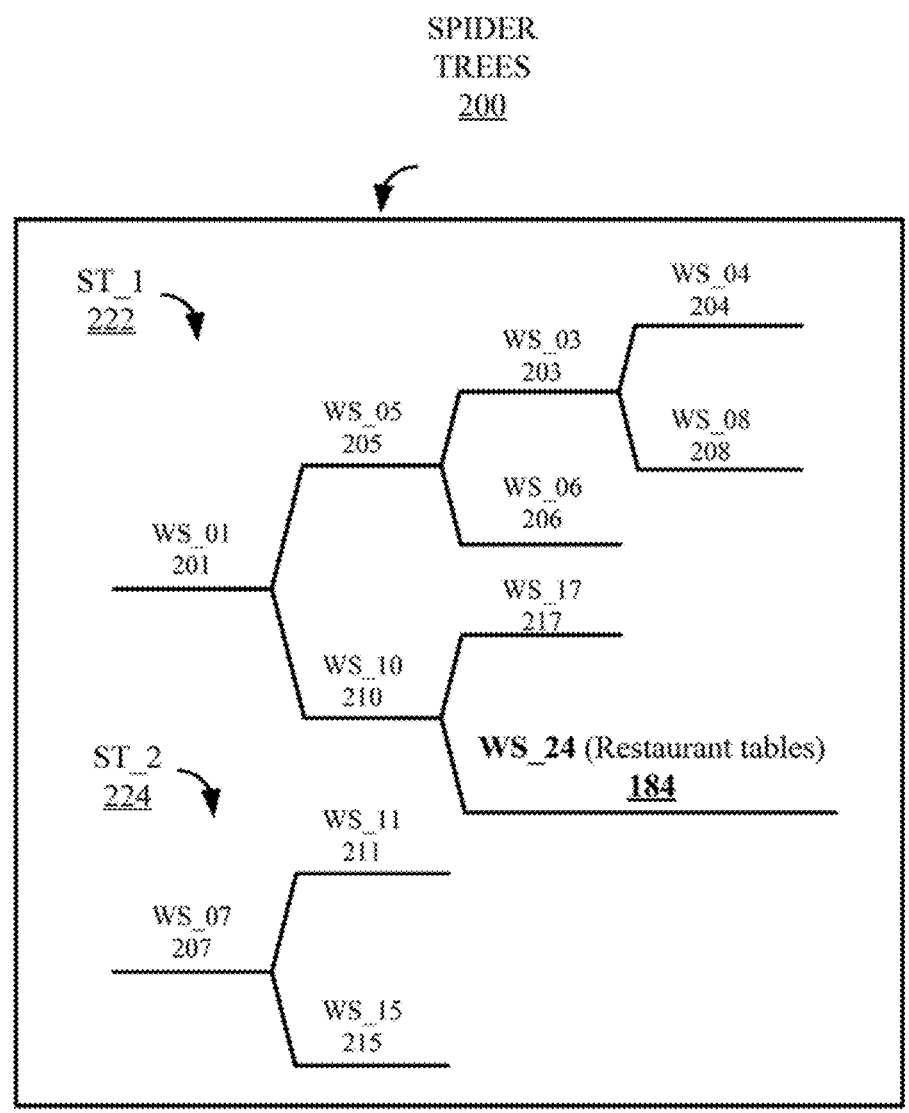
FIG. 4 is an example of spider tree structures that may be generated in accordance with the claimed subject matter.

FIG. 4 is an example of spider tree structures, or simply "spider trees," 200 that may be generated in accordance with the claimed subject matter, in this example. WS_24 of SR_24 184 (FIG. 3) has been added to an existing spider tree. i.e., a ST_1 222, by positioning cursor 191 (FIG. 3) over SR_24 184, right clicking mouse 110 (FIG. 1) and left clicking on ATST option 196 (FIG. 3). WS_24 is inserted into tree 222, which already includes other websites that have been entered in a similar fashion, i.e., a WS_01 201, a WS_03 203, a WS_04 204, a WS_5 205, a WS_6 206, a WS_08 208, a WS_10 210 and a WS_17 217. Another spider tree, i.e., a ST_2 224, includes a WS_07 207, a WS_11 211 and a WS_15 215. The generation and use of spider trees such as ST_1 222 and ST_2 224 are described in more detail below in conjunction with FIGS. 5 and 6.

Figure 5:
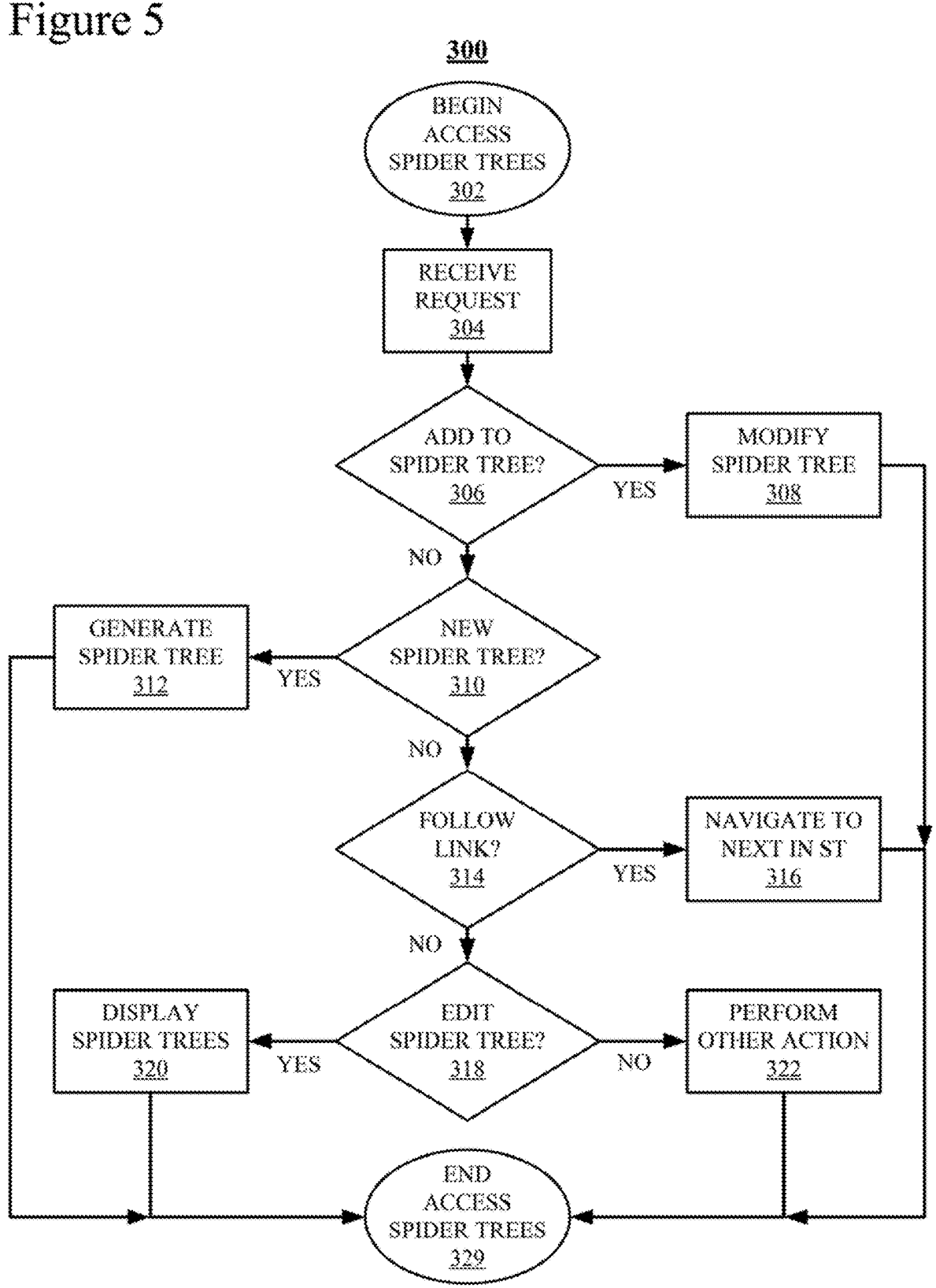
FIG. 5 is a flowchart of an Access Spider Trees process that may implement aspects of the claimed subject matter.

FIG. 5 is a flowchart of an Access Spider Trees process 300 that may implement aspects of the claimed subject matter. In this example, process 300 is associated with logic stored on CRSM 112 (FIG. 1) in conjunction with WBSM 118 (FIGS. 1 and 2) and executed on one or more processors (not shown) of CPU 104 (FIG. 1) of computing system 102 (FIG. 1).

Process 300 starts in a "Begin Access Spider Trees" block 302 and proceeds immediately to a "Receive Request" block 304. During processing associated with block 304, a request for action is received. In this example such a request is generated by a menu selection (see 194 and 196-199; FIG. 3) from an action window such as window 192 (FIG. 3) displayed in response to a right click on mouse 110 (FIG. 1) in window 160 (FIG. 3). During processing associated with an "Add to Spider Tree?" block 306. A determination is made as to whether or not the request received during block 304, i.e. the "received request," corresponds to, in this example, ATST option 196. If so, processing proceeds to a "Modify Spider Tree" block 308. In this example, during processing associated with block 308, a link corresponding to the highlighted search result 184 (FIG. 3) in window 192 is added at the current position in the current search tree, ST_2 224 (FIG. 4).

If, during processing associated with block 306, a determination is made that the received request does not correspond to option 196, control proceeds to a "New Spider Tree?" block 310. During processing associated with block 310, a determination is made as to whether or not the received request corresponds to ANST option 197. If so, control proceeds to a "Generate Spider Tree" block 312 during, which a new spider tree is generated with a link corresponding to the highlighted search result 184 in window 192 as the root node. If not, control proceeds to a "Follow Link?" block 314.

During processing associated with block 314, a determination is made as to whether or not the received request corresponds to FLK option 198. If so, control proceeds to a "Navigate to Next in Spider Tree (ST)" block 316. During processing associated with block 316, the next website connected to the link for result 184 in ST_2 224 is displayed in window 192. Typically, the website corresponding to result 184 may be displayed by merely clicking on the left button (not shown) of mouse 110. If, during processing associated with block 314, a determination is made that the received request is not ELK option 198, control proceeds to an "Edit Spider Tree?" block 318.

During processing associated with block 318, a determination is made as to whether or not the received request corresponds to EDST option 199. If so, control proceeds to a "Display Spider Trees" block 320. During processing associated with block 320, spider trees 200 (FIG. 4) is displayed in window 192 and the user may edit ST_1 222 and ST_2 224 using standard graphical editing techniques that will be familiar to those with skill in the relevant arts. For example, references to websites may be typed in, deleted, or "dragged and dropped" in different positions within and between ST_1 222 and ST_2 224.

If a determination is made that the received request does not correspond to EDST option 199, control proceeds to a "Perform Other Action" block 322. During processing associated with block 322, an action that would typically correspond to one of the standard options 194 is performed. Finally, once processing associated with any of blocks 308, 312, 316, 320 and 322 is performed, control proceeds to an "End Access Spider Trees" block 329 during which process 300 is complete.

Figure 6:
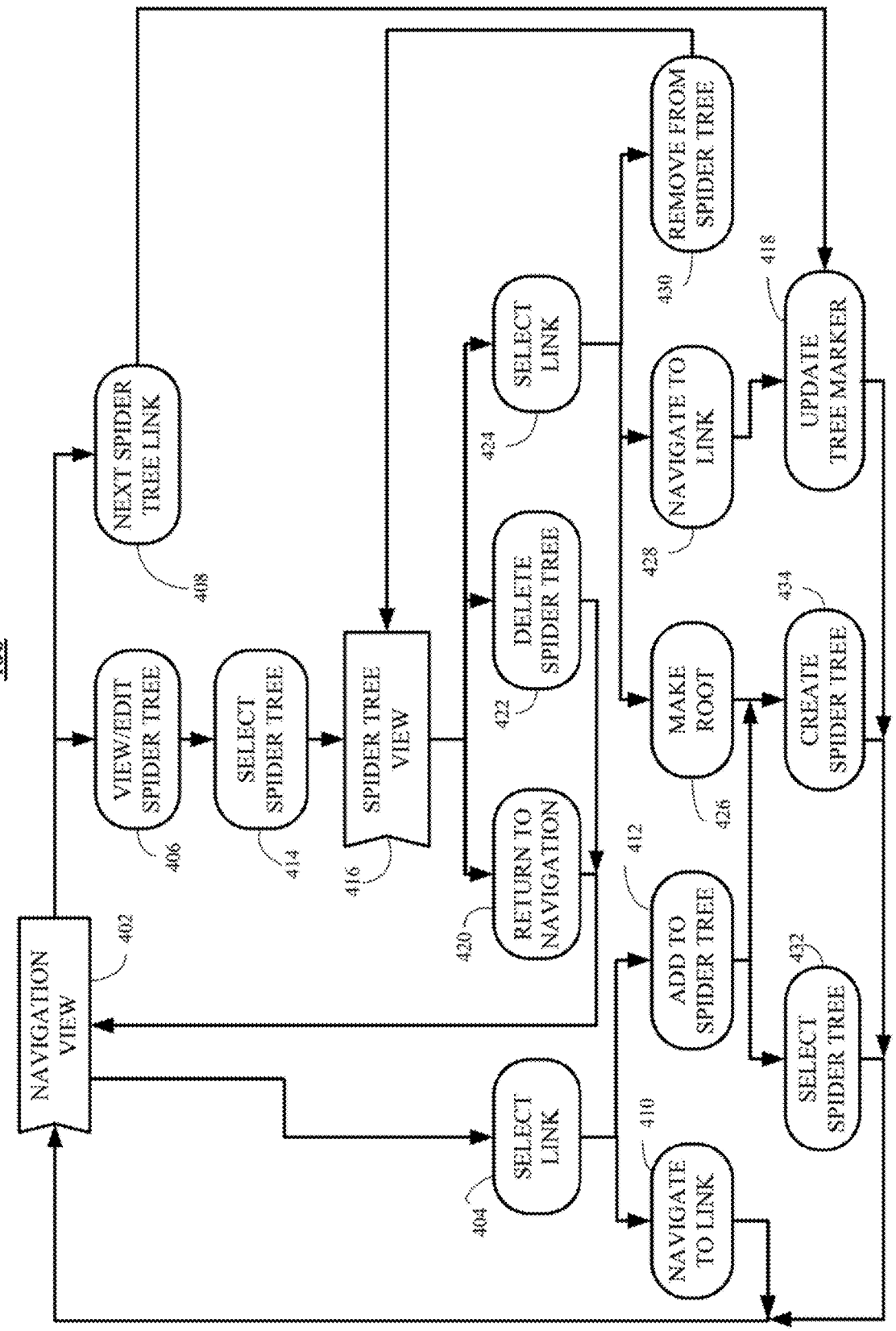
FIG. 6 is a Screen Navigation diagram that illustrates one possible embodiment of the claimed subject matter.

FIG. 6 is a Screen Navigation diagram 400 that illustrates one possible embodiment of aspects of the claimed subject matter. Diagram 400 starts in a "Navigate View" state 402. Navigate View 402 would typically be used in conjunction with a navigate tree process such as process 300 (FIG. 5) and be accessed via a popup menu such as action window 192 (FIG. 3). Navigate View 402 enables a user to select between three (3) options, i.e., a "Select Link" option 404, a "View/Edit Spider Tree" option 406 and a "Next Spider Tree Link" option 408.

Select Link $04 provides access to two (2) options, i.e., a "Navigate to Link" 412, which enables a user to display a web site corresponding to a particular link, and an "Add to Spider Tree" option 414, which enables a user to add the corresponding website link to either an existing or new spider tree. View/Edit Spider Tree 406 enables a user to access a "Select Spider Tree" option 414. Once a spider tree has been selected, a "Spider Tree View" 416 in which the spider tree selected with option 414 is displayed (see display 106, FIGS. 1 and 3). Next. Spider Tree 408 initiates an "Update Tree Marker" procedure 418 during which a spider tree, such as spider trees ST_1 222 (FIG. 4) and ST_2 224 (FIG. 4), is updated.

One a particular spider tree is displayed in conjunction with Spider Tree View 416, a user may exercise a "Return to Navigation" option 420, a "Delete Spider Tree" option 422 or a "Select Link" option 424, all of which should be self-explanatory, Following Return to Navigation 420 and Delete Spider Tree 422, navigation 400 returns to Navigation View 402. If a user exercises Select Link 424, three (3) options are available, i.e., a "Make Root" 426, a "Navigate to Link" 428 and a "Remove From Spider Tree" 430. Following completion of options 440, 418, 420, 422, 432 and 434, navigation returns to Navigation View 402. During Make Root 426, the link selected in Select Link 424 is made the root of a new spider tree, i.e., a new spider tree is created; during Navigate to Link 428, the corresponding link is displayed and, during Remove From Spider Tree 430, the selected link is removed from the corresponding spider tree.

Once Add to Spider Tree 412 has been selected, the user has two options, i.e., a "Select Spider Tree" option 432, during which a particular spider tree to which to add the link is selected, and a "Create Spider Tree" 434, during which the link is used to generate a new spider tree. Following completion of Remove From Spider Tree 430, navigation returns to Spider Tree View 416.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown m succession may, in Pact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I claim:
1. A method, comprising:
   automatically generating a hierarchical representation of a navigation order within a web browsing session in conjunction with a traversing of a plurality of websites within the browsing session;
   flagging individual websites of the plurality of websites to generate a user selected subset of the plurality of websites;

displaying a user interface in conjunction with the browser such that the user interface displays a hierarchical representation of the user selected subset and only the user selected subset and provides a traversal control with respect to the subset accordance with the hierarchical representation; and traversing the subset utilizing the traversal control.

2. The method of claim 1, wherein the user interface provides a capability to select and display a website of the plurality of websites.

3. The method of claim 1, wherein the user interface provides a capability to reorder the hierarchical representation.

4. The method of claim 1, wherein the user interface provides a capability to remove a website from the hierarchical representation.

5. The method of claim 1, further comprising:

detecting an end of the browser session; and removing the subset from the hierarchical representation in response to the detecting.

6. The method of claim 1, further comprising:

automatically generating a second hierarchical representation of a second navigation order within the web browsing session in conjunction with a second traversing of a second plurality of websites within the browsing session;

flagging a second subset of the second plurality of websites;

displaying the user interface in conjunction with the browser such that the user interface provides the traversal control with respect to the second subset in accordance with the second hierarchical representation; and traversing the second subset utilizing the traversal control.

7. The method of claim 1, further comprising:

generating a traversal history corresponding to the traversing of the subset utilizing the traversal control; and utilizing the traversal history to determine a particular website of the plurality of websites to focus on during the traversing.

* * * * *